United States Patent
Kim

(10) Patent No.: US 7,454,211 B2
(45) Date of Patent: Nov. 18, 2008

(54) METHOD AND APPARATUS FOR CALL SET UP IN A MOBILE COMMUNICATION SYSTEM

(75) Inventor: Hyo-Joon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 646 days.

(21) Appl. No.: 11/132,261

(22) Filed: May 19, 2005

(65) Prior Publication Data

US 2005/0260995 A1 Nov. 24, 2005

(30) Foreign Application Priority Data

May 19, 2004 (KR) .................. 10-2004-0035728

(51) Int. Cl.
*H04Q 7/20* (2006.01)
*H04B 7/216* (2006.01)

(52) U.S. Cl. .................. 455/445; 455/428; 455/439; 455/525

(58) Field of Classification Search .............. 455/445, 455/444, 524, 525, 550.1, 556.1, 556.2, 566, 455/428, 439; 370/335, 336, 337, 441, 442, 370/443, 395.1
See application file for complete search history.

(56) References Cited

U.S. PATENT DOCUMENTS 6,832,088 B1 * 12/2004 Stumpert .................. 455/445
6,947,747 B1 * 9/2005 Stumpert .................. 455/445
2003/0171120 A1 9/2003 Mustapha

FOREIGN PATENT DOCUMENTS

| EP | 1158823 | 11/2001 |
|---|---|---|
| EP | 1 363 467 | 11/2003 |
| KR | 2002-233152 | 3/2000 |
| KR | 2003-0009829 | 2/2003 |
| WO | WO 99/51051 | 10/1999 |
| WO | WO 02/058325 | 7/2002 |
| WO | WO 2004-034655 | 4/2004 |

OTHER PUBLICATIONS

Korean Office Action w/ Translation.

* cited by examiner

*Primary Examiner*—Melur Ramakrishnaiah
(74) *Attorney, Agent, or Firm*—Roylance, Abrams, Berdo & Goodman, LLP

(57) ABSTRACT

A method and apparatus for establishing a call between a calling mobile station and a called mobile station in a mobile communication system are provided. The method involves the steps of receiving a service request message from a calling radio network controller (RNC), and transmitting an incoming call request message to a called radio network controller (RNC), transmitting a first service connection path setup request to the calling RNC prior to receiving a service acceptance message from the called RNC, transmitting a second service connection path setup request to the called RNC, if the service acceptance message corresponding to the incoming call request is received from the called RNC and then if a first service connection path setup response corresponding to the first service connection path setup request is received from the calling RNC, and receiving, from the called RNC, a second connection path setup response corresponding to the second connection path setup request.

11 Claims, 5 Drawing Sheets

METHOD AND APPARATUS FOR CALL SET UP IN A MOBILE COMMUNICATION SYSTEM

CROSS-REFERENCE TO RELATED APPLICATION

This application claims the benefit under 35 U.S.C. §119 (a) of Korean patent application entitled "METHOD AND APPARTUS FOR CALL SET UP IN A MOBILE COMMUNICATION SYSTEM" filed in the Korean Industrial Property Office on May 19, 2004, and assigned Ser. No. 2004-35728, the entire contents of which are hereby incorporated by reference.

BACKGROUND OF THE INVENTION

1. Field of the Invention

The present invention relates to a mobile communication system. More particularly, the present invention relates to a method and an apparatus for establishing a call in a mobile switching center (MSC).

2. Description of the Related Art

Typically in a conventional mobile communication system, a procedure for setting a speech path based on radio network resources of the mobile station is required in order to establish a call for providing the service between mobile stations. Such a procedure for establishing the call should follow only a standardized procedure. Unlike a synchronous mobile communication system such as that employed in Korea, an asynchronous mobile communication system, which is some times called a "European Type" system, defines a procedure for establishing the call requiring two steps, that is, one step for setting up a Radio Resource Control (RRC) connection path for transmitting control information, and another step for setting up a service connection path for transmitting user traffics. Accordingly, the calling mobile station and the called mobile station perform the step for setting up the RRC connection path and the step for setting the user traffics connection, respectively.

FIG. 1 illustrates a structure of a conventional asynchronous mobile communication system. In FIG. 1, the system comprises a base station 105 for setting up an RRC connection path connected with a calling mobile station 100, a radio network controller (RNC) 115 for controlling the RRC connection path via the base station 105, a base station 130 for setting RRC connection path connected with a called mobile station 135, a radio network controller (RNC) 125 for controlling the RRC connection path through the base station 130, and a Mobile Switching Center (MSC) 120 for providing service connections between the RNCs 115 and 125. According to such a structure in the conventional asynchronous mobile communication system mentioned above, the users can communicate with each other through the mobile stations 100 and 135.

Each of the base stations 105, 110 and 130 has at least a transceiver capable of performing wireless communication with the mobile stations 100 and 135. The RNCs 115 and 125 control the base stations 105, 110 and 130, and exchange messages for setting up RRC connection path and the service connection path with the base stations 105, 110 and 130 and the MSC 120.

FIG. 2 illustrates a process for establishing a call in a conventional mobile communication system shown in FIG. 1. In FIG. 2, for simplicity and clarification to further understand the prior art, procedures for establishing the calls between the calling and the called stations and the base stations are omitted. At step 205, the calling mobile station 100 performs Radio Resource Control (RRC) connection setup between the base station and the calling mobile station 100 in accordance with control of the RNC 115. At step 210, if the RNC 115 transmits a service request message to the MSC 120, the MSC 120 receives the service request message. The service request message has been sent from the mobile station to the network to initiate a call establishment originated by the calling mobile station. Also, the service request message comprises a bearer capability. At step 215, the MSC transmits an incoming call request message to the RNC 125 which covers the called mobile station 135 located therein. Next at step 220, the RNC 125 sets up RRC connection path between the called mobile station 135 and the base station. Then at step 225, the RNC 125 transfers, to the MSC 120, the service acceptance message indicating that the called mobile station can accept the service requested by the calling mobile station. The service acceptance message also comprises the bearer capability. Next, at step 230, the MSC 120 which has received the service acceptance message transmits, to the RNC 115, a service connection path setup request message for transferring user traffics between the mobile stations and the base stations based on the types of the services. Then, at step 235, the RNC 115 sets up the service connection path for transferring the user traffics between the mobile stations and the base stations according to the setup request message of the MSC 120. Also at step 240, the RNC 115 sends a setup response message of the service connection path to the MSC 120. Then, at step 245, the MSC 120 sends the setup request of the service connection path to the RNC 125. Next, at step 250, the RNC 125 sets up the service connection path between the mobile terminal 135 and the MSC 120. Then at step 255, the RNC 125 provides a service connection path setup response, and completes all the process of the call setup. As a result, if the called mobile terminal gives a response to the ring caused by the call, then speaking or communication between the calling and the called mobile stations can be made through the established service connection path.

By the way, in process for RRC connection setup at step 220, if there is no response from the called mobile terminal, after a certain time period has elapsed, the MSC 120 sets up a service connection path connected with the calling mobile station in order to transmit service-unavailable notice broadcast.

Such a conventional process for establishing a service connection path setup can be classified largely into 4 steps including a first step for an RRC connection setup of the calling mobile station at step 205, a second step for an RRC connection setup of the called mobile station at step 220, a third step for a service connection path setup of the calling mobile station at step 235 and a fourth step for a service connection path setup of the called mobile station at step 250. The 4 steps mentioned above are performed sequentially according to the process flow. Therefore, the process for performing the service connection path setups of both the calling and the called mobile stations is a time-consuming procedure.

SUMMARY OF THE INVENTION

Accordingly, the present invention has been made to solve the above-mentioned problems occurring in the prior art, and an object of the present invention is to provide a method in which the time for establishing a call setup can be significantly decreased in a mobile communication system.

Another object of the present invention is to provide a calling setup method in which it is possible to perform substantially simultaneously both a step for service connection path setup of a calling mobile station and a step for an RRC connection path setup of a called mobile station.

In order to accomplish these objects, according to an aspect of the present invention, a method for establishing a call between a calling mobile station and a called mobile station in a mobile communication system is provided. The method comprising the steps of receiving a service request message from a calling radio network controller (RNC), and transmitting an incoming call request message to a called radio network controller (RNC), transmitting a first service connection path setup request to the calling RNC prior to receiving a service acceptance message from the called RNC, transmitting a second service connection path setup request to the called RNC, when received, from the called RNC, the service acceptance message corresponding to the incoming call request and then when received, from the calling RNC, a first service connection path setup response corresponding to the first service connection path setup request, and receiving, from the called RNC, a second connection path setup response corresponding to the second connection path setup request.

According to another aspect of the present invention, an apparatus for establishing a call between a calling mobile station and a called mobile station in a mobile communication system is provided. The apparatus comprises a receiving unit for receiving a service request message, a service acceptance message and a service connection path setup request message from a calling radio network controller (RNC), a control unit for confirming a requested service which has been requested through the service request message, determining if the service acceptance message from a called radio network controller (RNC) is received, and determining if a first service connection path setup response message from the calling RNC is received, and a transmitting unit for a first service connection path setup request message to the calling RNC in response to the service request message, wherein if receiving the service acceptance message and the first service connection path setup response message, the transmitting unit transmits a second connection path setup request message to the called RNC.

BRIEF DESCRIPTION OF THE DRAWINGS

The above and other objects, features and advantages of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Hereinafter, exemplary embodiments of the present invention will be described with reference to the accompanying drawings. A detailed description of known functions and configurations incorporated herein will be omitted for conciseness.

The exemplary embodiment of the present invention as described below substantially simultaneously performs a step for service connection path setup of a calling mobile station and a step for an RRC connection path setup of a called mobile station by a calling setup scheme in accordance with exemplary embodiments of the present invention, In FIG. 2, after receiving a service acceptance of a called mobile station, a service connection path setup of a calling mobile is established. This is mainly because the called mobile station should send its support capability to an Mobile Switching Center (MSC) such that the called mobile station negotiates its substantial support range with the MSC and then supports its capability of the negotiated support range when there are some differences between a requested capability of the calling mobile station and the substantial support capability of the called mobile station. In voice services, however, all the mobile stations can have the support capability for that voice services. Therefore, when the MSC confirms the requested service of the calling mobile station has been the voice service, then MSC can establish the service connection path setup of the calling mobile station to provide a speaking path without receiving any service acceptance from the called mobile station.

For example, in an asynchronous system, there are several types of services which the mobile station cannot support. The Adaptive Multi-Rate (AMR) of 12.2 Kbps, however, can be supported by all the mobile stations. Therefore, if the requested service of the calling mobile station is a voice service of just the AMR of 12.2 Kbps, the MSC establishes the service connection path setup based on the AMR without receiving any service acceptance from the called mobile station.

Figure 3:
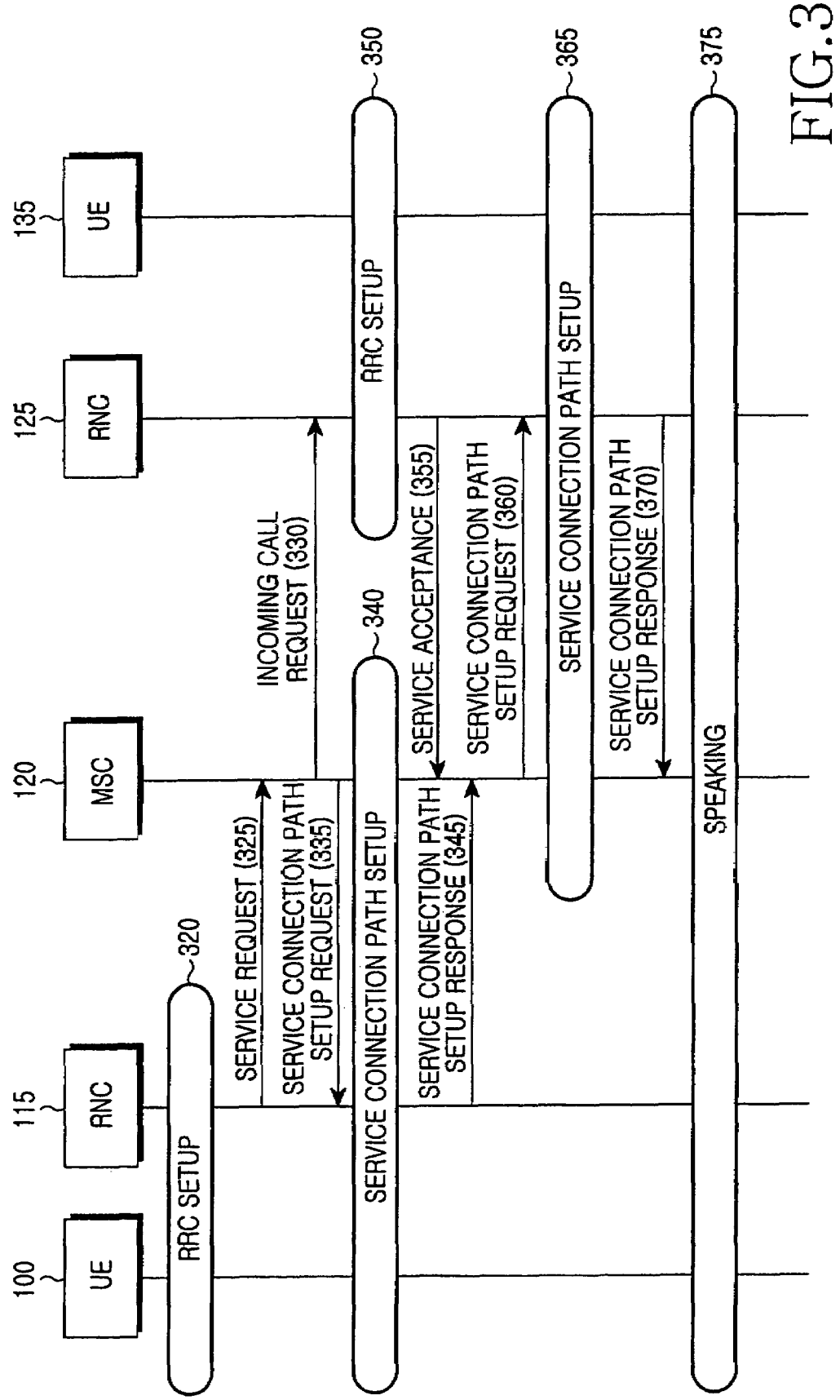
FIG. 3 is a diagram illustrating a call setup scheme in a mobile communication system according to an exemplary embodiment of the present invention.

FIG. 3 is a diagram illustrating a call setup scheme in a mobile communication system according to an exemplary embodiment of the present invention.

Referring to FIG. 3, at step 320, a calling mobile station, in other wards, User Equipment (UE), 100 establishes Radio Resource Control (RRC) setup through a Radio Network Controller (RNC) 115. Next, if the calling mobile station 100 sends a service request message to an MSC Mobile Switching Center (MSC) 120 at step 325, then at step 330, the MSC 120 sends an incoming call request to a called mobile station, in other wards, User Equipment (UE), 135 via an RNC 125 which has a coverage area where the called mobile station 135 is located. Also, the MSC 120 determines if the service request is a voice speaking service. If the voice speaking service, then at step 335, the MSC 120 sends immediately a predetermined service connection path setup request to the calling RNC 115. The term "immediately" indicates that, unlike the process of FIG. 2, the MSC 120 sends directly the service connection path setup request to the RNC 115 without receiving a service acceptance message from the called RNC 125.

At step 340, the calling RNC 115 receives the setup request message and establishes the service connection path setup for transferring user traffics between the calling mobile station 100 and the MSC 120. Also, the RNC 115 sends a service connection path response message to the MSC 120 at step 345, while the called mobile station establishes the RRC setup through the RNC 125 at step 350. Further, at step 355, the RNC 125 sends a service acceptance request message to the MSC 120. Next, when the MSC 120 receives the service acceptance of the called side and the service connection path setup response of the calling side, at step 360 the MSC 120 sends another service connection path setup request to the RNC 125. Next, the RNC 125 establishes the service connection path setup for transferring the user traffics between the called mobile station 135 and the MSC 120 at step 365. Also, at step 370, the RNC 125 sends the service connection path setup response to the MSC 120 to finally complete the whole process of the call setup. Next, if the called mobile station responds to ringing for speaking or communication, the speaking or communication is made at step 375.

When the called mobile station, however, does not respond to the ringing, the MSC 120 sends service-unavailable notice broadcast through a service connection path connected with the calling mobile station. Also, when there is no service acceptance at step 355, it is possible to rapidly provide the service-unavailable notice broadcast through a service connection path connected with the calling mobile station.

Figure 1:
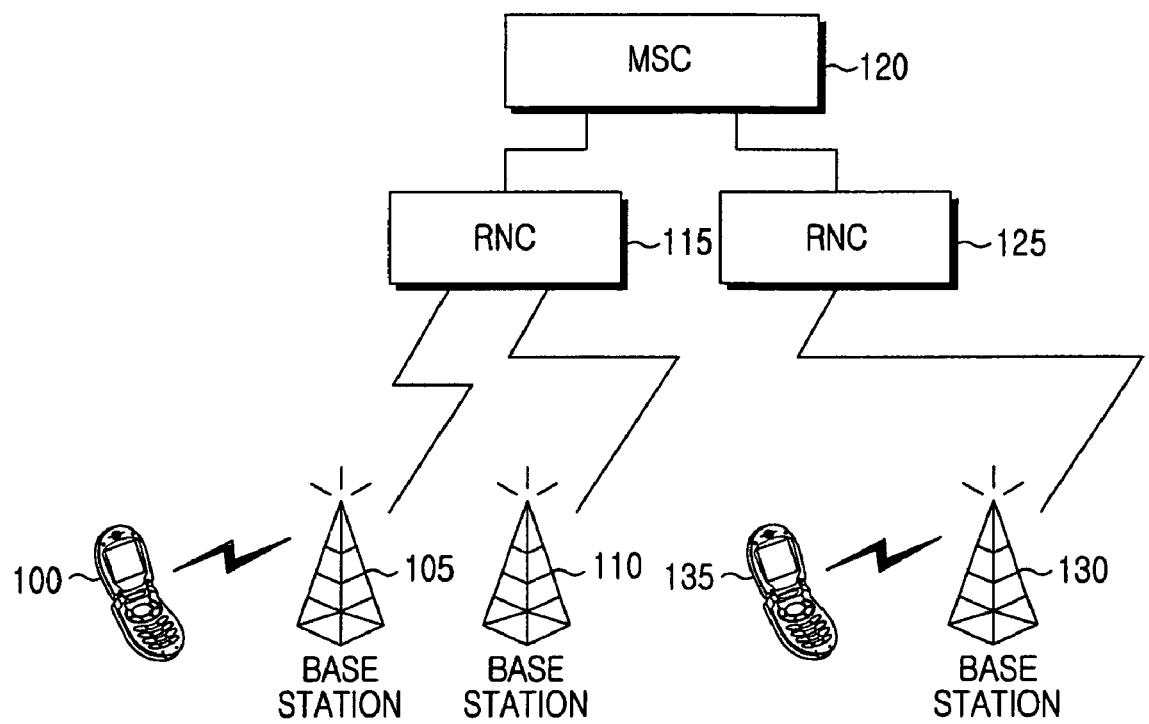
FIG. 1 is a block diagram illustrating a conventional mobile communication system.
Figure 2:
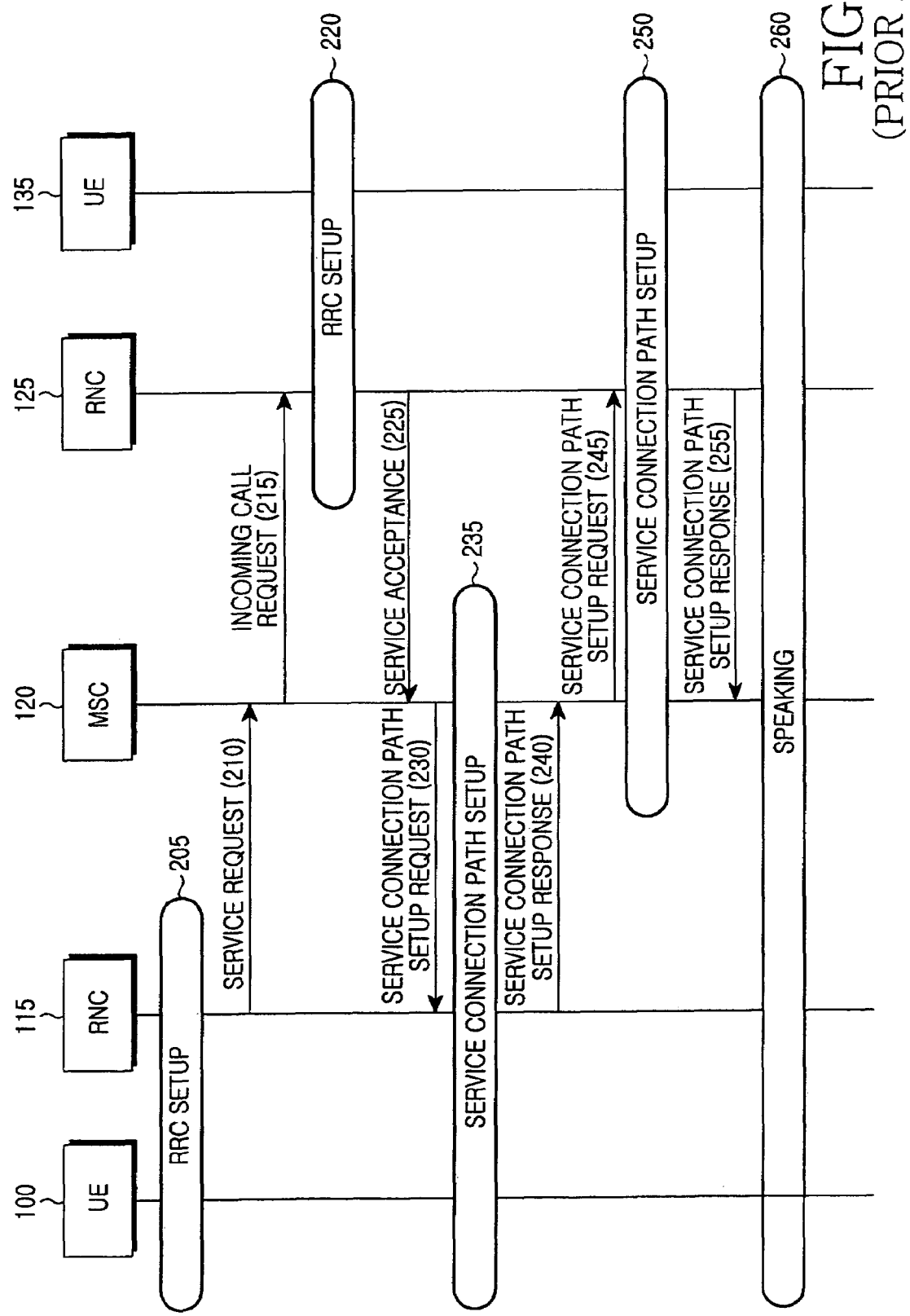
FIG. 2 is a diagram illustrating a call setup scheme in a conventional mobile communication system.

In the prior art of FIG. 2, only after the service acceptance of the called mobile station has been confirmed, the step of the service connection path setup for the calling mobile station is processed at step 235. Unlike the prior art, according to an exemplary embodiment of the present invention, both the step for establishing the Commitment, Concurrency and Recovery (CCR) connection setup of the called mobile station at step 350 and the step for establishing the service connection path setup of the calling mobile station at step 340 can be processed at the same time as shown in FIG. 3.

Specifically, in the process for establishing the service connection setup according to an exemplary embodiment of the present invention, after establishing the Radio Resource Control (RRC) connection path setup of the calling mobile station at step 320, both establishing the CCR connection path setup of the called mobile station at step 350 and establishing the service connection path setup of the calling mobile station at step 340 are performed the same time or substantially the same time. Next, the step for establishing the service connection path setup of the called mobile station is processed at step 365.

Figure 4:
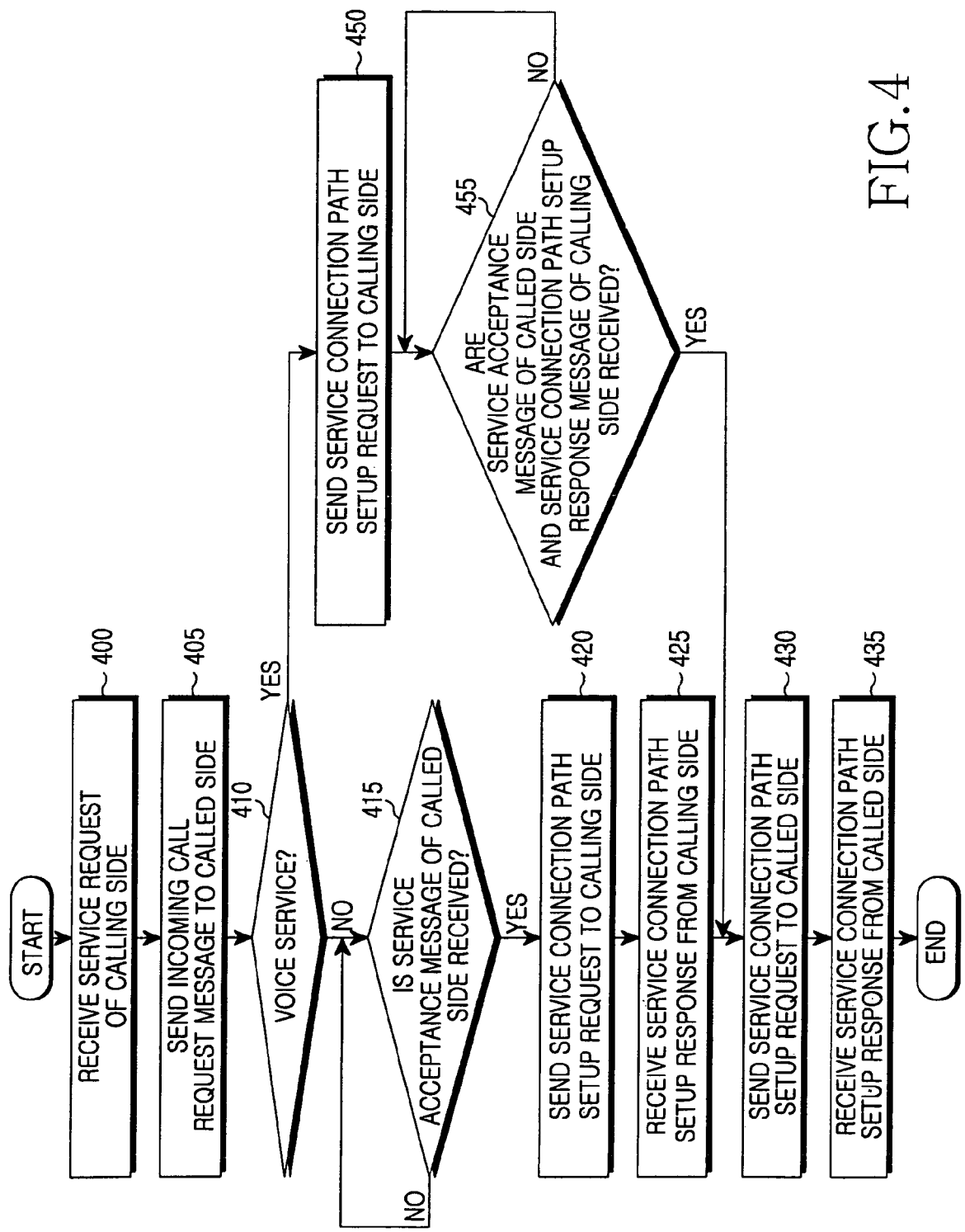
FIG. 4 is a flow chart explaining the operation process of a mobile switching center according to an exemplary embodiment of the present invention.

FIG. 4 is a flow chart for explaining the operation process of a mobile switching center according to an exemplary embodiment of the present invention.

When the MSC receives the service request message from the calling RNC at step 400, the MSC sends the incoming call request message to the called mobile station at step 405, and determines if the requested service is a voice service or a dynamic image service at step 410. If the requested service is not the voice service, for example, asynchronous Adaptive Multi Rate (AMR), or synchronous Qualcomm Code Excited Linear Predictive (QCELP), but the dynamic image service, the MSC waits for the service acceptance message from the called RNC at step 415. When the service acceptance message is received, then the process proceeds to the step 420 wherein the MSC sends the service connection path setup request to the calling RNC. Next, when the MSC receives the service connection path setup response message from the calling RNC at step 425, similarly the MSC, again, sends the service connection path setup request to the called RNC at step 430. At step 435, the service connection path setup response is made to finally complete the whole process of the call setup. Therefore it is possible to speak or communicate between the users through the mobile communication system.

Contrarily, at step 410, if the requested service is just the voice service which is supported by the called mobile station, at step 450, the MSC sends the service connection path setup request message of the calling mobile station to the calling RNC without waiting for the service acceptance of the called mobile station. In this case, both the step for establishing the CCR connection path setup of the called mobile station and the step for establishing the service connection path setup of the calling mobile station are performed at the almost same time. At step 455, the MSC operates in a standby mode until receiving all of both the service connection path setup response and the service acceptance message of the called RNC. The elapsed times of receiving the response and the service acceptance messages may be different from each other according to the service connection path setup time of the calling side or the RRC setup time of the called side. If receiving all, the process proceeds to step 430, and if not, the process returns to step 455. Finally, the MSC sends the service connection path setup request message to the called RNC at step 430, and receives the service connection path setup response to eventually complete the whole process of the call setup at step 435.

Figure 5:
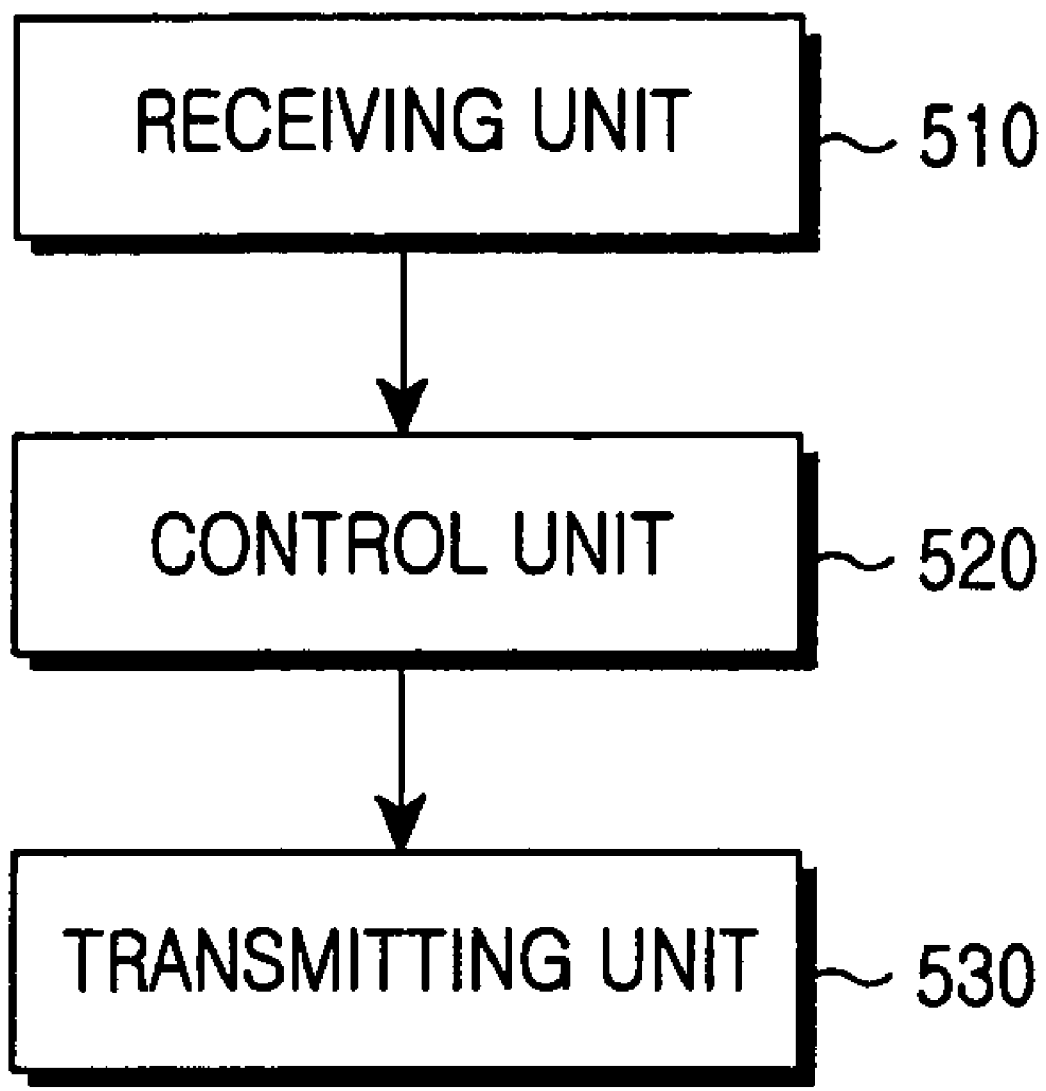
FIG. 5 is a block diagram illustrating a structure of a mobile switching center according to an exemplary embodiment of the present invention.

FIG. 5 illustrates a structure of a mobile switching center according to an exemplary embodiment of the present invention.

Referring to FIG. 5, a receiving unit 510 is a module for receiving messages transmitted from the calling RNC and the called RNC. The messages transmitted from the RNCs comprises for example, a service request message from the calling RNC and a service connection path setup response message which is transmitted after setting up the service connection path. Also the receiving unit 510 receives a service acceptance message indicating a service-availability of the called mobile station, and a service connection path setup response message from the called RNC.

A control unit 520 determines if a requested service can be supported by the called mobile station. The requested service has been requested through the service request message and the receiving unit 510 has previously received the requested service as mentioned above. If the requested service is for example, a voice service of AMR 12.2 kbps, the control unit 520 sends a service connection path setup request message to a transmitting unit 530 in order to transmit the request message to the calling RNC.

When the control unit 520 does not receive a response message corresponding to the service connection path setup request from the calling radio network controller, the control unit 520 provides a service-unavailable notice broadcast via a service connection path previously setup between the called RNC and the control unit 520.

The transmitting unit 530 is a module for transmitting messages to the calling RNC and the called RNC. Specifically, the transmitting unit 530 transmits, to the calling RNC, the service connection path setup request message which has been transmitted from the control unit 520. Further, the transmitting unit 530 transmits, to the called RNC, an incoming call request message and the service connection path setup request message based on the service acceptance message.

According to an exemplary embodiment of the present invention as mentioned above, the elapsed time for establishing a call between the calling and called mobile stations can be significantly reduced because, in the mobile switching center, the incoming call request message and the service connection path setup request message can be transmitted in the same period of time. If the response message of the called mobile station is not received, it is possible to further rapidly make the service-unavailable notice broadcast through a service connection path previously set and connected with the calling mobile terminal.

While the invention has been shown and described with reference to exemplary embodiments thereof, various changes in forms and details may be made within the scope of the present invention. For example, in addition to the asynchronous mobile communication system mentioned above, the principle of the present invention may be applied to all the other mobile communication systems or its equivalents similar to the asynchronous system in structure and operation thereof. Accordingly, the scope of the present invention should not be limited to the embodiments described in the specification but to the appended claims or its equivalents.

What is claimed is:

1. A method for setting up a call between a calling mobile station and a called mobile station in a mobile communication system, the method comprising the steps of:

receiving a service request message from a calling radio network controller (RNC), and transmitting an incoming call request message to a called radio network controller (RNC);

transmitting a first service connection path setup request to the calling RNC prior to receiving a service acceptance message from the called RNC;

transmitting a second service connection path setup request to the called RNC, after receiving both the service acceptance message corresponding to the incoming call request from the called RNC and a first service connection path setup response corresponding to the first service connection path setup request from the calling RNC; and receiving, from the called RNC, a second connection path setup response corresponding to the second connection path setup request.

2. The method as claimed in claim 1, wherein the method further comprises the steps of:

determining if a requested service requested through the service request message can be supported by the called mobile station; and transmitting the service connection path setup request to the calling RNC if the requested service can be by the called mobile station.

3. The method as claimed in claim 1, wherein the method further comprises the step of providing a service-unavailable-notice broadcast via a service connection path previously set up and connected with the calling RNC, if the service acceptance message corresponding to the incoming call request is not received from the called RNC.

4. The method as claimed in claim 2, wherein the service which can be supported by the called mobile station is a voice service of the Adaptive Multi Rate (AMR) 12.2 kbps.

5. The method as claimed in claim 1, wherein the incoming call request message and the first service connection path setup are transmitted substantially simultaneously.

6. An apparatus for setting up a call between a calling mobile station and a called mobile station in a mobile communication system, the apparatus comprising:

a receiving unit for receiving a service request message and a service connection path setup response message from a calling radio network controller (RNC);

a control unit for determining if both a service acceptance message from a called radio network controller (RNC) and a first service connection path setup response message from the calling RNC are received; and a transmitting unit for transmitting a first service connection path setup request message to the calling RNC in response to the service request message, wherein the transmitting unit transmits a second service connection path setup request message to the called RNC after receiving both the service acceptance message and the first service connection path setup response message.

7. The apparatus as claimed in claim 6, wherein the control unit determines if a requested service requested through the service request message can be supported by the called mobile station, and the control unit transmits the service connection path setup request to the calling RNC via the transmitting unit, if the requested service can be supported by the called mobile station.

8. The apparatus as claimed in claim 7, wherein the service which can be supported by the called mobile station is a voice service of the Adaptive Multi Rate (AMR) 12.2 kbps.

9. The method as claimed in claim 6, wherein the control unit provides a service-unavailable-notice broadcast via a service connection path previously set up and connected with the calling RNC, if the response message corresponding to the service connection setup request is not received from the called RNC.

10. The apparatus as claimed in claim 6, wherein the transmitting unit transmits an incoming call request message to the called RNC at substantially the same time as transmitting the first service connector path setup request.

11. The apparatus as claimed in claim 6, wherein the transmitting unit transmits the first service connector path setup request prior to the service acceptance message being received.

* * * * *